United States Patent [19]

Takahashi

[11] 4,325,905

[45] Apr. 20, 1982

[54] METHOD FOR PRODUCING A DOUBLE-WALLED PAPER CONTAINER

[75] Inventor: Keiichi Takahashi, Ichikawa, Japan

[73] Assignee: Tokan Kogyo Co., Ltd., Tokyo, Japan

[21] Appl. No.: 176,792

[22] Filed: Aug. 11, 1980

Related U.S. Application Data

[63] Continuation of Ser. No. 887,372, Mar. 16, 1978, abandoned.

[30] Foreign Application Priority Data

| Mar. 23, 1977 | [JP] | Japan | 52-31151 |
| Mar. 23, 1977 | [JP] | Japan | 52-31152 |
| Mar. 23, 1977 | [JP] | Japan | 52-31153 |
| Mar. 23, 1977 | [JP] | Japan | 52-31154 |
| May 24, 1977 | [JP] | Japan | 52-59347 |
| May 24, 1977 | [JP] | Japan | 52-59348 |

[51] Int. Cl.$^3$ .................... B29C 17/04; B29D 3/00; B32B 1/10
[52] U.S. Cl. .................... 264/516; 156/108; 156/212; 156/287; 264/522; 425/504
[58] Field of Search ........... 264/514, 516, 520, 522, 264/296; 425/503, 504; 156/212, 287, 108

[56] References Cited

U.S. PATENT DOCUMENTS

| 2,691,797 | 10/1954 | Bertleff et al. | 264/552 |
| 2,736,065 | 2/1956 | Wilcox | 156/287 X |
| 2,985,915 | 5/1961 | Winstead | 264/522 X |
| 3,041,669 | 7/1962 | Marshall et al. | 264/553 X |
| 3,042,969 | 7/1962 | Shaul | 264/553 X |
| 3,169,086 | 2/1965 | Meissner | 264/516 X |
| 3,453,162 | 7/1969 | Turner | 264/516 X |
| 3,528,865 | 9/1970 | Amberg et al. | 264/516 X |
| 3,533,135 | 10/1970 | Christensson | 425/504 |
| 3,654,012 | 4/1972 | Schlager | 156/212 |
| 3,893,882 | 7/1975 | Repenning | 264/522 X |

FOREIGN PATENT DOCUMENTS

51-1440562 6/1976 Japan ...................... 264/296

*Primary Examiner*—Jan H. Silbaugh
*Attorney, Agent, or Firm*—Charles A. Brown

[57] ABSTRACT

A double-walled paper container produced by placing a preformed paper container in a shaping die set cavity of a vacuum draw shaping apparatus, positioning a single piece of synthetic resin film or sheet on the top of said paper container, holding the film at the peripheral edge thereof, heating the film to make the plastic film, stretching the film and applying negative pressure to the film to line said preformed paper container with the film is in water-tight fashion and wherein the lined paper container has a good shape holding ability and is hygienic for the user thereof.

2 Claims, 20 Drawing Figures

METHOD FOR PRODUCING A DOUBLE-WALLED PAPER CONTAINER

This is a continuation of application Ser. No. 887,372 filed Mar. 16, 1978, and now abandoned.

BACKGROUND OF THE INVENTION

This invention relates to double-walled cup-shaped containers comprising an outer cup-shaped paper container and an inner thermoplastic synthetic resin container having a similar shape and a smaller thickness applied on at least the side wall thereof to the side wall of the paper container. The inner thermoplastic synthetic resin container is formed of a seamless continuous synthetic film or sheet. This invention also relates to the method for producing such double-walled containers which comprises the steps of placing a preformed paper cup having an adhesive applied to the inner surface thereof, in the cavity of a shaping die set, positioning a piece of of thermoplastic synthetic resin sheet or film on the top of the die set across the mouth of the paper cup, heating the resin sheet or film to render the sheet plastic and drawing the sheet or film under negative pressure into the cavity in the paper cup to cause the sheet or film to adhere to at least the inner surface of the side wall of the paper cup.

There have been proposed and practically employed a variety of double-walled paper cups for holding liquid products for drinking in the past. The prior art double-walled paper cup has been hithertofore produced by providing a preformed paper cup having an adhesive applied to the inner surface thereof, laminating a piece of synthetic resin sheet or film onto the adhesive-applied inner surface of the paper cup to form the inner layer of the paper cup and curling the mouth upper peripheral rim of the paper cup together with the laminated resin layer. The thus produced double-walled paper cup has the advantages that the curled mouth upper peripheral rim gives a pleasant appearance to the paper cup and that the curled construction of the cup mouth upper peripheral rim provides a substantial rigidity against deformation of the cup when gripped. However, although the paper material of the paper cup has the resin film laminated thereon, the liquid content tends to leak through the seam between the cup side wall and the resin film laminated to the paper material of the cup to make the paper cup soggy and weak. Especially, when the content of the paper cup is a liquid at elevated temperature, the content leaking and paper weakening problems become more serious.

Since the upper peripheral rim of the mouth of the paper cup has been curled together with the laminated resin film, although the external surface of the curled mouth upper peripheral rim of the paper cup is covered by the laminated synthetic resin sheet or film, a portion of the external surface of the cup side wall immediately below or contiguous to the curled mouth upper peripheral rim is exposed. Thus, when the user desires to drink the liquid content, his lips inevitably contact the exposed external surface portion of the cup side wall directly and this is not agreeable from the view point of hygienics. Although the prior art vacuum formed containers have the advantage that they can be produced at relatively less expense, since the container have a small thickness, the prior art vacuum formed containers have the disadvantage that they have a low shape holding ability insufficient to maintain their shape against deformation when gripped.

There have been also proposed paper containers for holding liquid products provided with a peeping window. The paper containers of the type have a transparent plastic film applied to the window area. Thus, the paper containers have the disadvantage that the production of the containers require much manual efforts to the degree that the containers are rendered not suitable for mass production system.

SUMMARY OF THE INVENTION

Therefore, one object of the present invention is to provide a double-walled paper container for holding liquid products at low or high temperatures for a fairly long period of time while eliminating the problem relating to leaking and/or becoming soggy by integrally applying a seamless continuous piece of synthetic resin film or sheet to at least the inner surface of the side wall and bottom of a preformed paper container.

Another object of the present invention is to provide the construction of a hygienic double-walled paper container for holding liquid products for drinking in water-tight fashion in which a single piece of synthetic resin film or sheet is applied to not only the inner surfaces of the bottom and side wall and the external surface of the mouth upper peripheral rim of the paper container, but also to a portion of the external surface of the side wall immediately below or contiguous to the mouth upper peripheral rim of the paper container where the user's lips directly contact when he desires to drink the liquid product.

Still another object of the present invention is to provide the construction of a hygienic double-walled paper container for holding liquid products for drinking in water-tight fashion in which a single piece of synthetic resin film or sheet is applied to a portion of the external surface of the side wall of the paper container immediately below or contiguous to the mouth upper peripheral rim of the paper container where the user's lips directly contact when he desires to drink the liquid content to thereby make the lip contacting portion hygienic and the mouth upper peripheral rim is rolled or curled together with the resin film or sheet applied thereto to give a sufficient shape holding ability to the container.

Still further another object of the present invention is to provide a method for producing a double-walled paper container having a peeping window in the side wall of the container and a single transparent plastic film applied to the inner surface of the container including the portion of the peeping window at relatively less expense. The plastic film applied to the inner surface of the paper container has a reduced thickness in a substantial portion except for the portion thereof covering the peeping window in the container.

Yet still further object of the present invention is to provide a double-walled paper container which is less expensive and which comprises an inner synthetic resin container formed by vacuum-shaping a single piece of synthetic resin film or sheet as conventionally practiced and an outer paper container applied to the external surface of the inner synthetic resin container to give a high shape holding ability to the inner resin container.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

Figure 1:
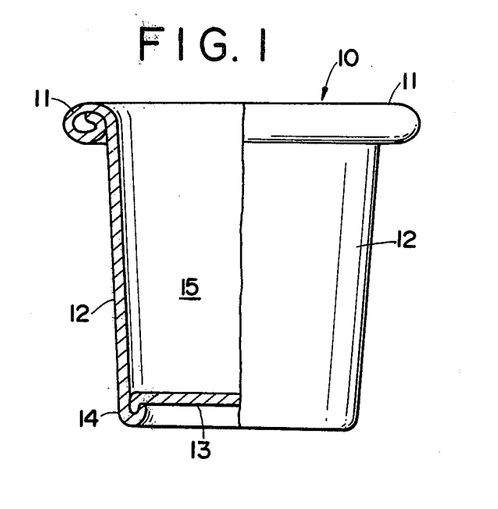
FIG. 1 is an elevational view of a preformed paper container to be lined with a plastic film according to one embodiment of the present invention showing one half portion thereof in vertical section.
Figure 2:
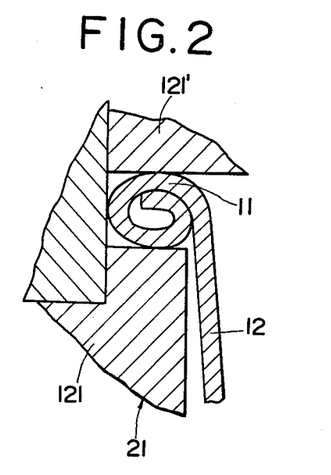
FIG. 2 is a fragmentary vertical sectional view on an enlarged scale of the preformed container showing how to form the curled mouth upper peripheral rim in the paper cup.
Figure 3:
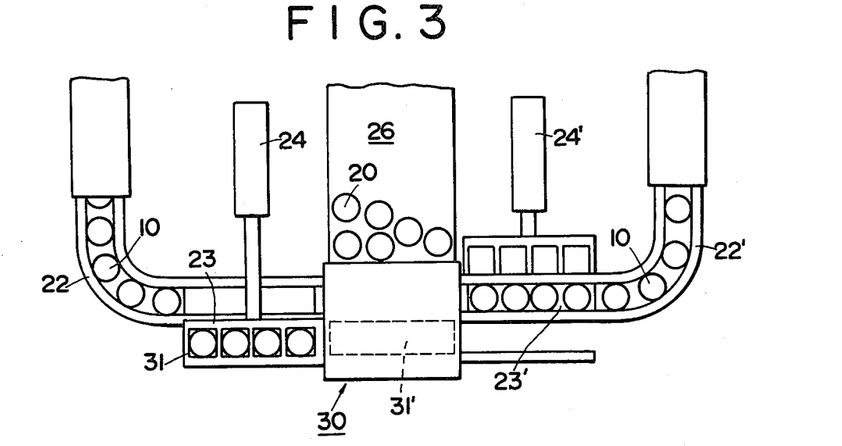
FIG. 3 is a fragmentary schematic plan view of one embodiment of apparatus suitably employed in carrying out the method for producing a double-walled paper cup in accordance with the present invention.

Referring now to the accompanying drawings and more particularly, to FIG. 1 thereof in which a preformed container 10 having the cross section configuration as shown suitable for mass production system is shown in a partial vertical section. The curled upper peripheral rim 11 of the mouth of the container 10 is pinched between the cavity forming die member 21 and the reciprocally movable upper frame 121' of a die set 21 to be flattened in at least the upper portion of the curl as shown in FIG. 2 and thereafter, a suitable adhesive is applied to the external surface of the curled and flattened upper peripheral rim 11 of the mouth and the inner surfaces of the side wall 12 and bottom 13 of the container 10, respectively by means of spray coating and the like, for example. A plurality of preformed containers 10 having the adhesive coating applied to the parts thereof referred to hereinabove are in succession conveyed on a conveyer system 22, 22' through the shaping apparatus as shown in FIG. 3. As the containers 10 are conveyed on the conveyer system, the containers are aligned in rows on movable aligning plates 23, 23' respectively provided along the conveyer system 22, 22' respectively and then placed in shaping die sets 31, 31'. As more clearly shown in FIG. 3, the first die set 31 and second die sets 31', both are connected at the respective ends to make one body for movement together leftwards or rightwards as seen in FIG. 3. While the containers 10 are being placed in the first die set 31 by means of an assist plug 24, for example, the second die set 31' in which the preformed containers 10 have been previously placed is positioned within the shaping apparatus 30 in which the containers 10 are to be supplied with a synthetic resin film to form a double-walled paper container shaped in the manner as will be described hereinafter in connection with various embodiments of the invention. In this way, the first and second die sets 31, 31' alternately receive the containers 10 therein and move the received containers to and into the shaping apparatus 30 and this operation is repeated for the succeeding containers to be conveyed.

Figure 4:
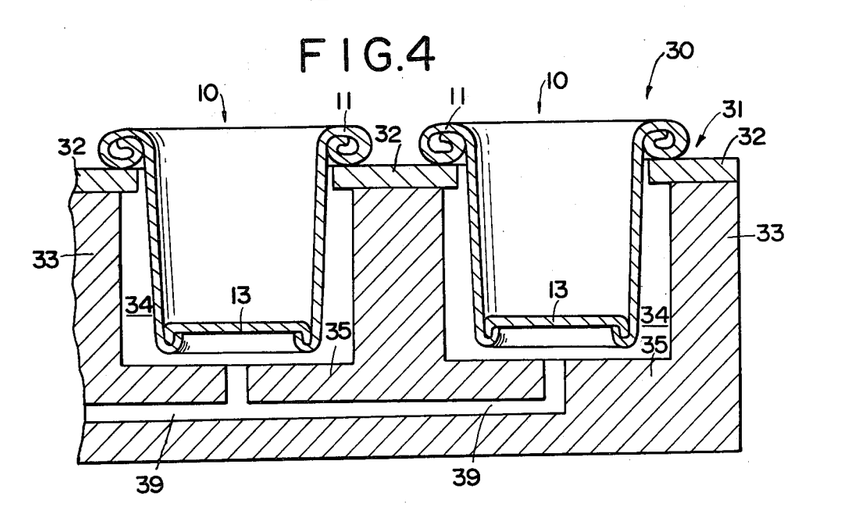
FIG. 4 is a fragmentary vertical sectional view on an enlarged scale of the shaping die set of the apparatus as shown in FIG. 3.

As more clearly shown in FIG. 4, the die set 31 has a frame member 32 on the top thereof and when the curled upper peripheral rims 11 of the mouths of the performed containers 10 are seated on the frame member, the containers 10 are suspended in the corresponding cavities 34 formed in a cavity forming die member 33 by means of the upper peripheral rims 11 seating on the frame member 32 with the undersurfaces of the rims 11 in contact with the upper surface of the frame member 32. With the containers 10 being suspended in the corresponding cavity 34 in this way, there is provided a clearance between the undersurface of the container bottom wall 13 and the inner bottom surface 35 of the cavity forming die member 33. The bottom of the cavity forming member 33 is provided with an exhaust conduit 39 which communicates at one or the inner end with the cavities 34 and at the other or outer end with a vacuum pump (not shown).

Figure 5:
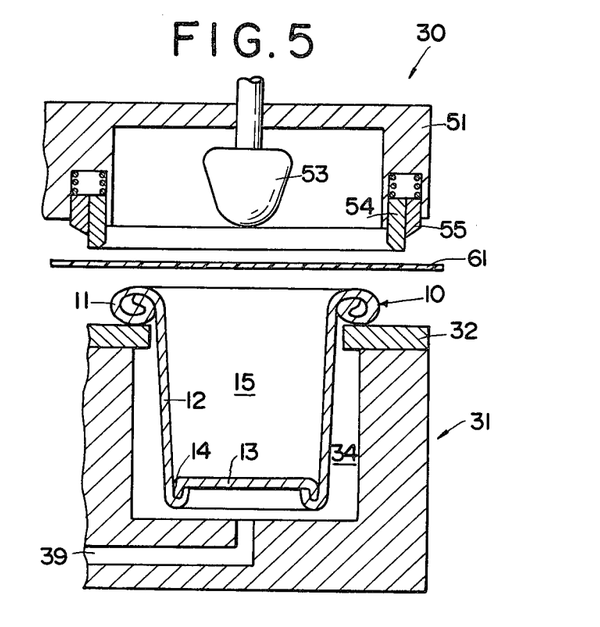
FIG. 5 is a fragmentary vertical sectional view of one embodiment of the shaping die set employed in the apparatus as shown in FIG. 3.
Figure 6:
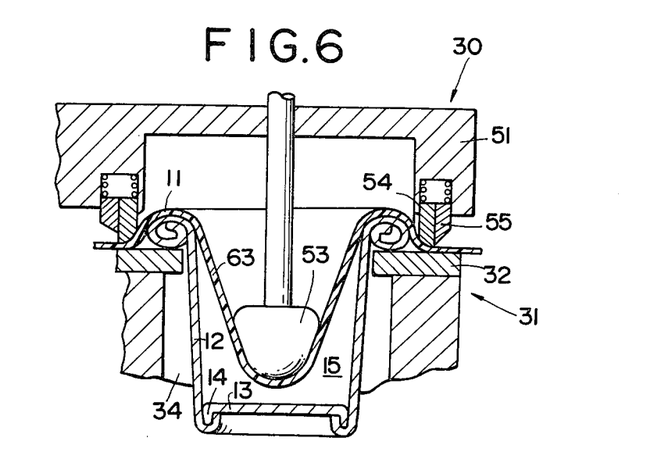
FIG. 6 is similar to FIG. 5, but shows the upper frame and assist plug in their lowered positions.

After the performed containers 10 have been received in the corresponding cavities 34 in the die set 31 in the manner mentioned herein above (only one container 10 and its associated cavity 34 are shown in FIGS. 5 and 6), a piece of heated synthetic resin film 61 is positioned above the die set 31 which is now positioned within the shaping apparatus 30 to extent across the mouth of the performed container 10, the vertically reciprocal upper frame member 51 is lowered down towards the die set 31 until the pressure application portion 54 of the upper frame 51 presses the edge of the film 61 against the frame member 32 associated with the particular cavity 34 in which the paper container 10 is now suspended therein and then, an assist plug 53 which is slidably received in the upper frame 51 is driven downwardly into the cavity 34 to draw the film 61 deep into the cavity 34 which in turn stretches the film as shown by reference numeral 63 in FIG. 6. Thereafter, negative pressure is applied to the exhaust conduit 39 by the actuation of the vacuum pump (not shown) so as to apply negative pressure to the cavity 34 whereupon the undersurface of the upper peripheral rim 11 of the container mouth is caused to closely contact the frame member 32 and the negative pressure within the cavity 34 increases. As the result, the clearance 14 defined by the bottom 13 and side wall 12 of the paper container 10 is maintained at negative pressure and the cavity 15 in the paper container 10 is also maintained at negative pressure by virtue of the permeability of the material of the bottom and side wall of the paper container whereby the stretched film 63 is caused to closely contact the entire inner surface of the side wall 12 and bottom 13 of the container 10 and positively secured to the paper container 10 by means of the adhesive applied to the inner surface of the paper container as an integral component of the container. In order to positively secure the film 61 to the external surface of the mouth upper peripheral rim 11, it is an effective means to pass the die set 31 through an oven in which the film is subjected to contraction action.

Figure 7:
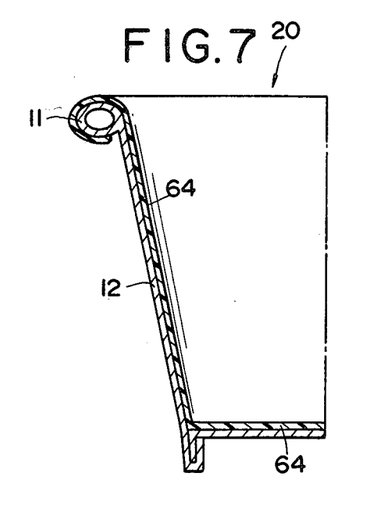
FIG. 7 is a vertical sectional view of one half portion of one type of double-walled paper container or product produced by the method in accordance with the present invention.

Thus, as more clearly shown in FIG. 7, a single synthetic resin film 64 is applied to the external surface of the mouth upper peripheral rim 11 and the inner surfaces of the side wall 12 and bottom 13 of the container 10 as an integral component thereof. Thereafter, the upper frame 51 is further lowered into the cavity 34 until the cutting edge 55 on the upper frame 51 shears or trims the synthetic resin film 61 (FIG. 6). Thereafter, the upper frame 51 is raised up and air at positive pressure is pumped throught the exhaust conduit 39 into the cavity 34 in the cavity forming die member 33 whereby the paper container 20 which has now the synthetic resin film integrally applied to the inner surface thereof rises upwardly out of the cavity forming die member 31 onto the conveyer 26 (FIG. 3).

In the embodiment described hereinabove, although the preformed paper container 10 has the adhesive applied to the external surface of the mouth upper peripheral rim 11 and the inner surfaces of the side wall 12 and bottom 13 of the container, the present invention is not limited to the employment of the adhesive application step. Instead, it is also contemplated that an adhesive be applied to one side of the blank for the paper container at the areas constituting the side wall and bottom when the blank is formed into the preformed container and the blank is shaped into the container so as to dispose the adhesive-applied side inside and then placed in the cavity forming die member 31 in which the paper is subjected to the above-mentioned shaping step to obtain the complete double-walled paper container 20 having the plastic film integrally applied thereto. Alternatively, when low density polyethylene or the like which exhibits a good adhesion for the paper material of the container is employed as the synthetic resin film, the adhesive application step may be eliminated.

And it is also contemplated that a fine through hole or holes are formed in the side wall and/or bottom of the preformed container 10 to accelerate the application of negative pressure through the cavity 34 in the cavity forming die member 31 to the cavity 35 in the paper container to thereby reduce the shaping cycle time resulting in improvement of container production efficiency. in such case, the fine through hole or holes formed in the side wall and/or bottom of the preformed paper container should have a small size sufficient enough to be blocked by the synthetic resin film applied to the container.

And as described hereinabove in connection with FIG. 2, after the mouth upper peripheral rim 11 has been flattened by being pinched between the components of the die set 21, when the paper container 20 is filled with a desired liquid content and covered by a suitable cover, the container has the advantage that a positive seal is easily formed in the container.

However, a container 20 having a synthetic resin film applied to the inner surface thereof can be produced without flattening the mouth upper peripheral rim 11 of the preformed paper container so as to seal the mouth and accordingly the flattening step described in connection with FIG. 2 may be eliminated in the present invention if desired.

Figure 8:
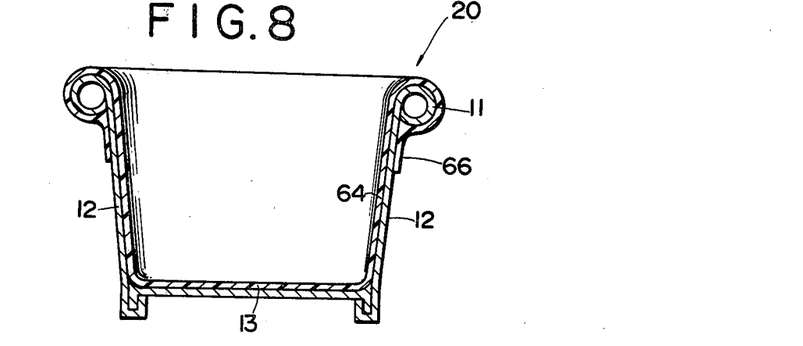
FIG. 8 is a vertical sectional view of another type of double-walled paper container of product produced by the method in accordance with the present invention.

Although the container 20 having the synthetic resin film 64 laminated on the inner surface thereof is capable of receiving a liquid and hygienic, such container has the disadvantage that when a user desires to drink the liquid content, his lips tend to directly contact the external paper layer of a preformed container 10 immediately below or contiguous the mouth upper peripheral rim 11 of the container 20. Thus, in order to eliminate this disadvantage, a container 20 in which the synthetic resin film 64 extends to the external surface of the portion of the side wall 12 of the preformed container 10 immediately below or contiguous to the mouth upper peripheral rim 11 of the container and the extension of the resin film is shown in FIG. 8 and identified by the reference numeral 66. The method for producing such a container will be now described.

Figure 9:
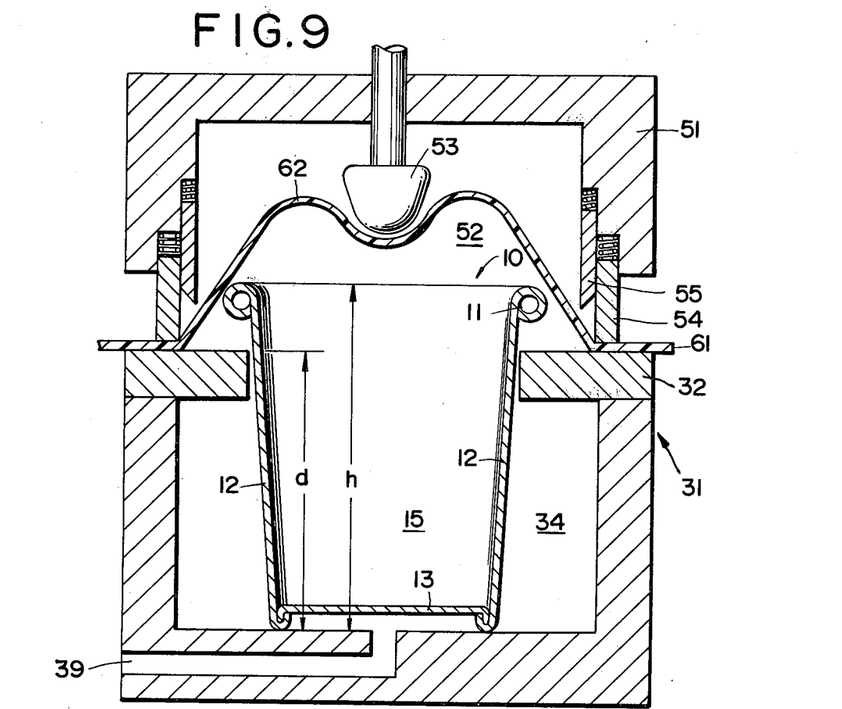
FIGS. 9, 10 and 11 are vertical sectional view showing another type of shaping die set employed in an apparatus for producing the product as shown in FIG. 8 in accordance with the present invention.

The preformed container 10 which has been produced by the conventional method as described in connection with FIG. 1 is placed in the shaping die set 31 as shown in FIG. 9. In this case, the depth or height d of the of the cavity 34 formed in the die set 31 is smaller than the height h of the preformed container 10 so that the mouth upper peripheral rim 11 and a portion 16 of the side wall 12 immediately below or contiguous to the rim of the container protrude upwardly of the top frame member 32 of the die set 31 when the contained 10 is placed in the die set 31 (see FIG. 9). After the preformed container 10 has been placed in the die set 31 in the manner as mentioned hereinabove, a synthetic resin film 61 is positioned above the die set 31 across the mouth of the preformed container 10 and the upper frame 51 having a pressure application portion 54 extending downwardly therefrom is lowered towards the die set 31 to press the peripheral edge of opposite ends of the film against the frame member 32 as shown in FIG. 9. Thereafter, heated air is pumped from an external source (not shown) through the exhaust conduit 39 formed in the die set to the cavity 34 in the die set to heat the film 61 to thereby stretch the film 61 into the cavity 52 in the vertically reciprocal upper frame 51 as shown by reference numeral 63 in FIG. 9. Thereafter, an assist plug 53 which is slidably received in the upper frame 51 is lowered into the cavity 15 in the preformed container 10. Thereafter, negative pressure from an external vacuum source (not shown) is applied through the exhaust conduit 39 to the cavity 34 in the die set whereby the film portion 65 disposed between the mouth curled upper peripheral rim 11 and the upper frame member 32 is drawn against the external surface of the preformed container 10 positioned immediately below or contiguous to the curled mouth upper peripheral rim 11 to form the laminar 66 on the external surface of the side wall portion 12 (See FIG. 8) and at the same time, the negative pressure is also applied through the side wall 12 and bottom 13 of the container to the cavity 15 in the container so as to cause the film 63 to stretch into the paper cavity 15 by the assist plug 53 to closely contact the inner surfaces of the side wall 12 and bottom 13 of the container. Thereafter, the upper frame 51 is further lowered until the cutting edge 55 on the upper frame 51 shears off the film 61 adjacent and inwardly of the outer peripheral edge thereof and thereafter, the upper frame 51 is raised away from the die set and at the same time, positive pressure is applied through the exhaust conduit 39 to the shaping die set 31 to discharge the complete double-walled container 20 having the film applied to desired areas thereof as shown in FIG. 8 out of the die set 31.

Figure 10:
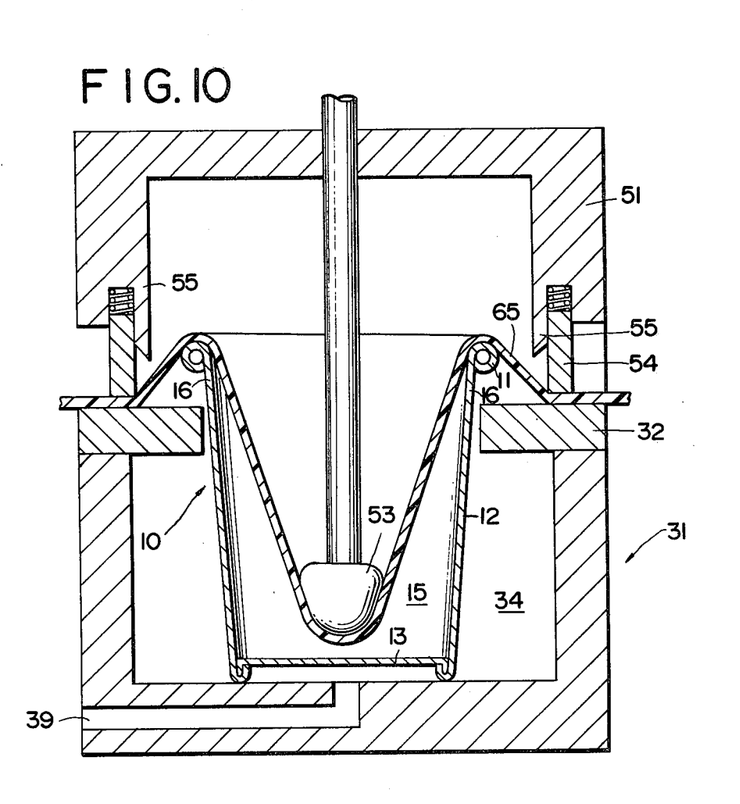
Figure 11:
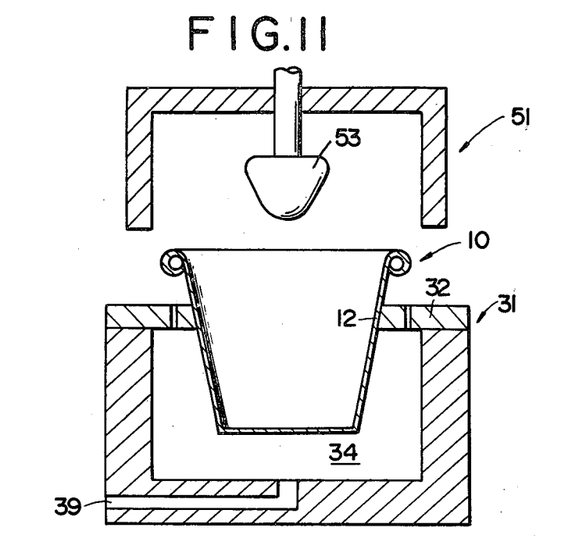

In the embodiments of the method for producing paper containers according to the present invention as shown in FIGS. 9 and 10, although the shaping die set 31 is shown as having a height smaller than that of the preformed paper container 10, the present invention is not limited to the use of such a shaping die set. Thus, as shown in FIG. 11, for example, when the inner diameter of the annular frame member 32 is reduced by a small amount, the container 10 is gripped in a position between the upper and lower ends thereof of the side wall 12 by the frame member 32 of the shaping die set 31 in a suspension state in the cavity 34 or alternatively, a rest having a suitable height may be placed on the bottom of the die cavity 34. Such alternative embodiments are also within the scope of the present invention.

Figure 12:
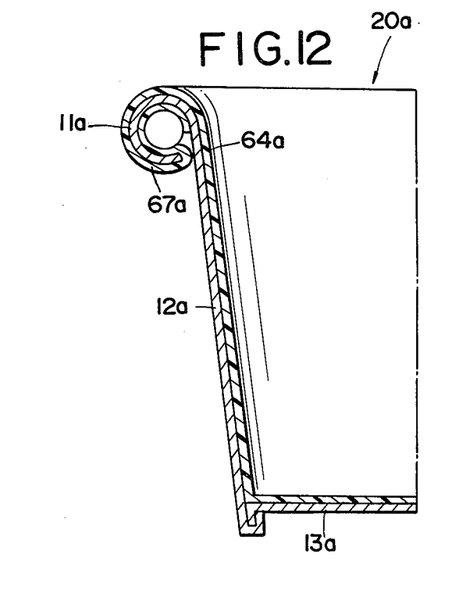
FIG. 12 is a vertical sectional view of one half portion of another type of double-walled paper container or product produced by the method in accordance with the present invention.

The complete double-walled paper container 20 as shown in FIG. 7 or 8 has the synthetic resin film covering the mouth upper peripheral rim 11 is hygienic and presents a pleasant appearance. However, since the mouth upper peripheral rim 11 where the container or cup receives its holding or gripping force and holds the mouth against deformation has only the synthetic resin film laminated on the external surface of the paper material of the rim, the cup holding force provided by the rim is insufficient. Therefore, according to the present invention, as shown in FIG. 12, the paper material of the mouth upper peripheral rim 11 is sandwiched in between synthetic resin film layers 64, 67 to form a laminar construction and the paper material and film layers are rolled together radially and outwardly to give the reinforced mouth upper peripheral rim 11 to the complete double-walled container 20. Such a container 20 is produced by the arrangement as shown in FIG. 13.

Figure 13:
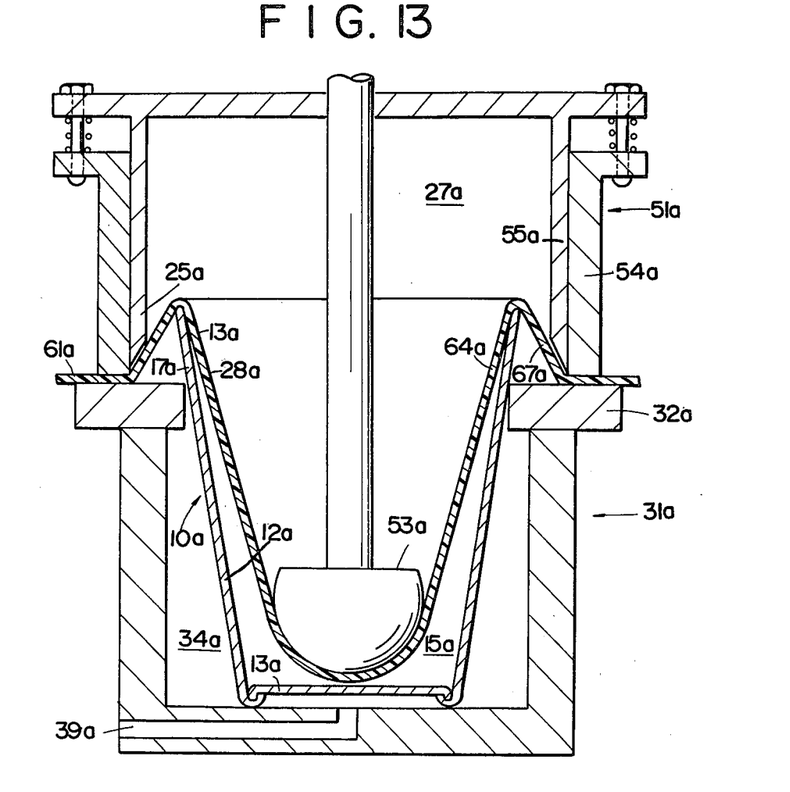
FIG. 13 is a vertical sectional view of another type of shaping die set employed in the apparatus for producing the double-walled paper container of product as shown in FIG. 12.

Referring now to FIG. 13, another embodiment of the present invention is exemplified. A paper container 10b has the side wall 12 and bottom 13 integrally formed and the mouth upper peripheral rim which has not been curled and the container 10a is placed in the cavity 34a formed in the shaping die set 31a with an upper portion 17a of the side wall 12a where the rim is formed extending upwardly of the annular frame member 32a. Thereafter, a synthetic resin film 61a is positioned on the frame member 32a across the mouth of the container and the upper frame 51a having the pressure application portion 54 thereon is lowered towards the shaping die set 31a until the outer peripheral edge of the film 61a is pinched between the pressure application portion 54a and frame member 32a. In this embodiment, prior to and/or after the pinching of the film, the film is heated by a suitable heating means and stretched into the cavity 15a in the paper container 10a by the descending assist plug 53a.

Thereafter, prior to or after the lowering of the shearing cutting edge 55a to remove excess material from the film 61a, negative pressure from an external vacuum source (not shown) is applied through the exhaust conduit 39a to the shaping die cavity 34a to thereby firmly apply the film layers 67a and 64a to the external surface of the side wall upper extension 16a and the inner surface of the side wall 12a of the container 10a, respectively and then, the container is taken out of the shaping die set 31a.

After the container 20a has been taken out of the shaping die set 31a, the mouth upper peripheral rim of the container is curled by a conventional curling machine to thereby obtain a double-walled paper container 20a having the mouth upper peripheral rim 11a comprising the paper layer having the synthetic resin film applied to the opposite sides thereof (see FIG. 12). Since the mouth upper peripheral rim 11a of the double-walled container has the film layers 64a, 67a laminated on the both sides thereof and rolled together, the thus formed mouth upper peripheral rim 11a not only presents a pleasant appearance and a good feeling to the user's lips, but also has a sufficient strength. And since the container is free of deformation when gripped with a normal gripping force, the container 20a holds its shape suitable for drinking. In addition, since the film 64a on the inner surface of the container is formed of a seamless single film piece, even when the container is filled with hot water, the container has the advantage that the hot water will not permeate into the paper layer through the inner film.

The method and apparatus for easily producing the double-walled paper container having the synthetic resin film 66 applied to the external surfaces of the mouth upper peripheral rim 11 and adjacent portion 16 of the side wall 12 immediately below and contiguous to the rim will be described hereinbelow.

Figure 14:
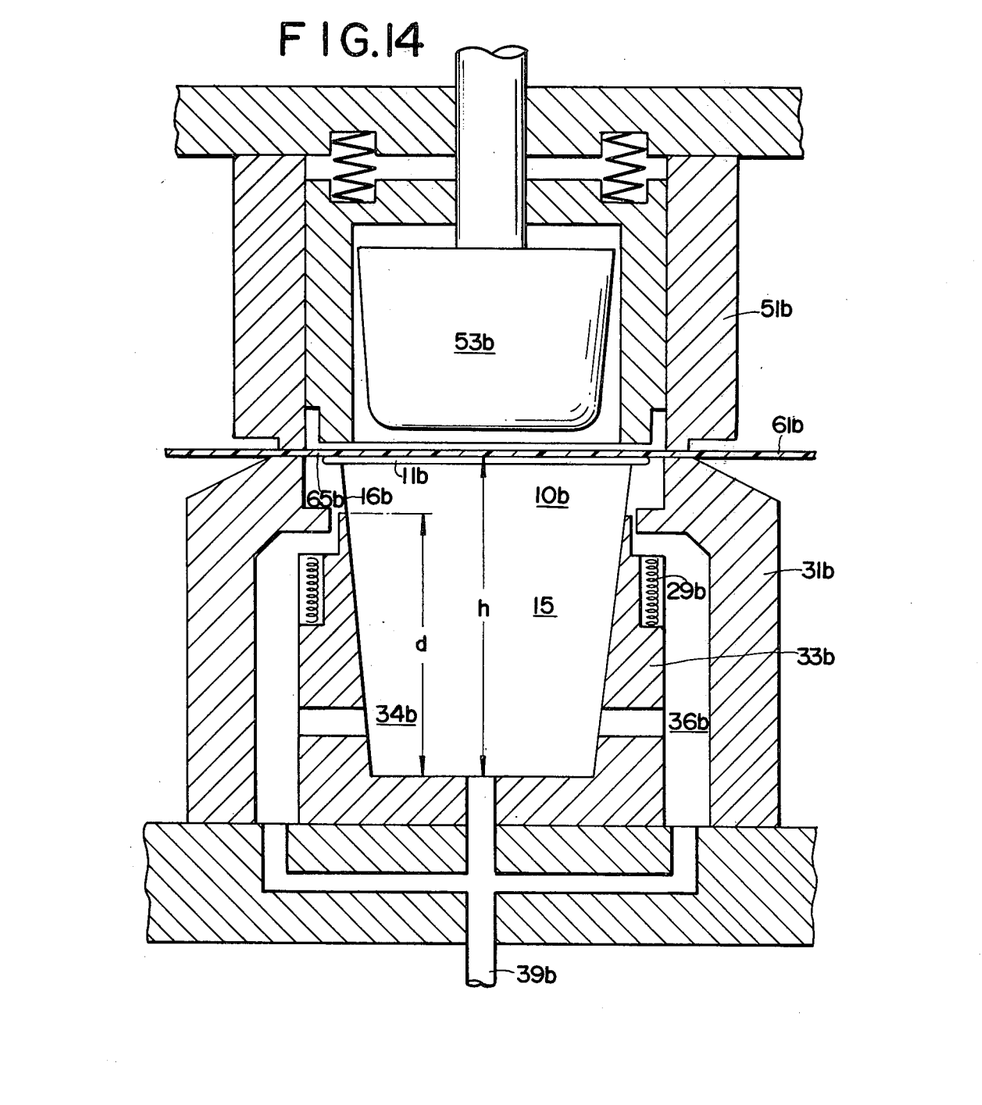
FIG. 14 is a fragmentary vertical sectional view of another type of shaping die set for producing the double-walled paper container or product as shown in FIG. 8.
Figure 15:
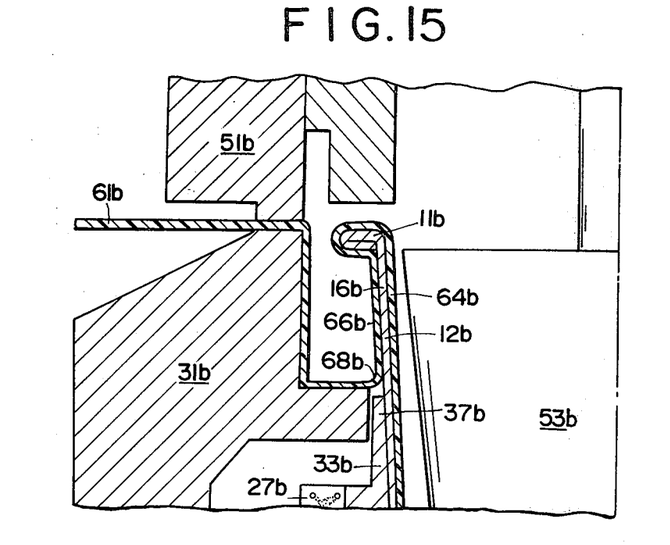
FIGS. 15 and 16 are fragmentary section views showing the operation of the shaping die set as shown in FIG. 14.
Figure 16:
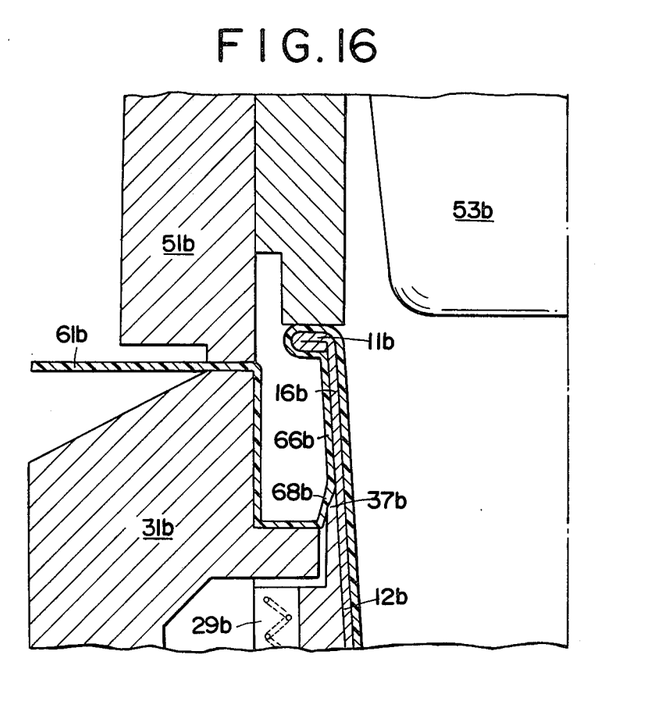

Referring to FIG. 14, further embodiment of the present invention is exemplified. The preformed paper container 10b produced by the conventional mass production system and having the bottom 13, side wall 12 and mouth upper peripheral rim 11 formed therewith is placed in the cavity forming die member 33b of the shaping die set 31b as shown in FIG. 14. In the shaping apparatus of FIG. 14, the depth or height d of the cavity 34b in the cavity forming die member 33b of the shaping die set 31b is smaller than the height h of the container 10b so that the mouth upper peripheral rim 11b and its contiguous side wall portion 16 of the preformed container 10b will protrude upwardly of the cavity forming die member 33b of the shaping die set 31b. After the placement of the paper container 10b in the shaping die set 31 in this way, a plastic film 61 is positioned on the die set 31b across the mouth of the container and then, the upper frame 51b is lowered until the lower end of the upper frame 51b pinches the peripheral edge of the film 61b in cooperation with the upper end of the die set 31b to hold the film under tension. Thereafter, the film 61b is heated by any suitable heating means and the assist plug 53b is lowered into the paper container cavity 15b to stretch the film. Following the stretching step of the film, negative pressure from any external vacuum source is applied through the exhaust conduit 39b to the cavity 34b in the cavity forming die 33b of the shaping die set 31b and to the annular outer cavity 36b defined between the cavity forming die member 33b and shaping die set 31b whereby the negative pressure is also applied to the cavity 15b in the cup or container 10b. The application of negative pressure to the container cavity 15b draws the film 61b which has been stretched by the assist plug 53b against the inner surfaces of the container side wall 12b and bottom 13 and stretches the film portion 65b present between the mouth upper peripheral rim 11b and upper frame 32 to cause the film to adhere to the external surface of the side wall upper portion 16 as shown by reference numeral 66b (see FIG. 15). Thereafter, the cavity forming die member 33b having the preformed paper container 10b received therein is raised. As the cavity forming die member 33b and the preformed paper container 10b rise up within the shaping die set 31b, the tapered upper end 37b of the cavity forming die member 33b shears the film portion 68b extending along the inner surface of the shaping die set 31b off the film 61b as excess film material (see FIG. 16) and also trims the lower end of the film portion 66b adhering to the external surface of the side wall portion 12.

In the past, it has been proposed that a paper container having the synthetic resin film 64 applied to the inner surface of the side wall 12 is provided with a peeping window 17 so that the color and shape of the content within the container can be clearly observed, but the prior art container of the type has the disadvantages that the production of the container requires many manual operations and that an excessive amount of synthetic resin material is consumed to the degree that the container can not be economically produced. However, according to the present invention, the container provided with the peeping window can be produced at relatively less expense.

Figure 17:
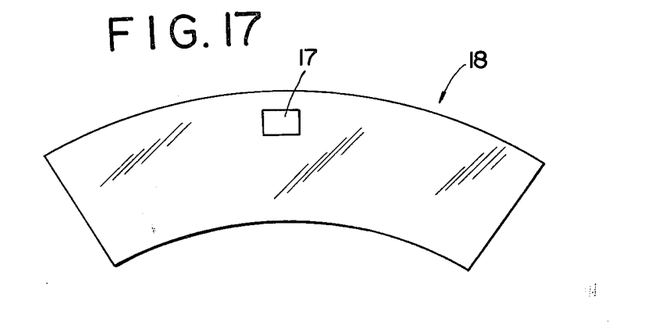
FIG. 17 is a plan view of the blank from which a cup having a peeping window therein is formed.
Figure 18:
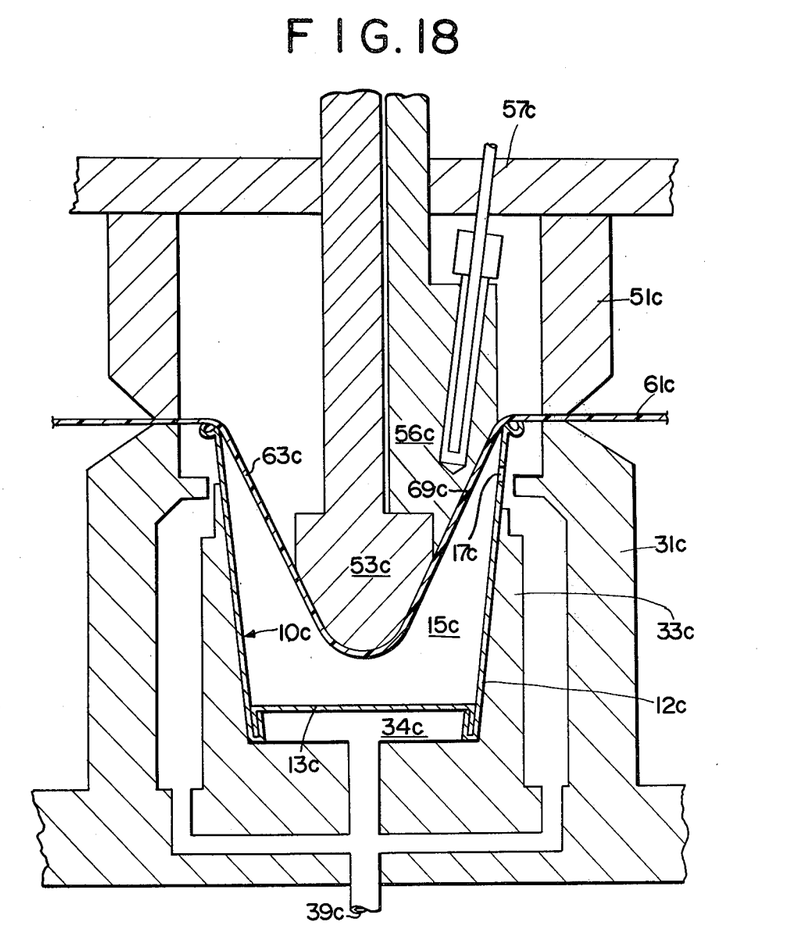
FIG. 18 is a schemative elevational view of another type of shaping die set for producing a double-walled paper container.

Referring now to FIG. 17, there is shown a container blank 18 for the side wall 12 of a preformed container 10c having a desired size and provided with a through hole 17 by punching. The preformed container 10c having the blank 18 is placed in the cavity formed in the cavity forming die member 33 of the shaping die set 31 together with a bottom panel blank 13 for preformed the container 10c as shown in FIG. 18. A plastic film 61c is positioned on the top of the shaping die set 31c across the mouth of the container and thereafter, the upper frame 51c is lowered towards the die set 31c to pinch the peripheral edge of the film 61c in cooperation with the upper end of the die set 31c. Thereafter, the vertically reciprocal assist plug 53c slidably received in the upper frame 51c is lowered into the cavity 15c in the container 10c to stretch the film 61c to a suitable shape and size as shown by reference numeral 63c. At this time, the plastic film 61c extending across the mouth of the container and the assist plug 53c are heated to a suitable and desired temperature to thereby assist the stretching of the film 61c. As more clearly shown in FIG. 18, a cooling die 56c having a cooling end face is movably mounted on the upper frame 51c in a position adjacent the through hole 17c in the preformed container 10c and as the plastic film 61c is stretched by the assist plug, when the film has stretched to a desired thickness, the cooling die 56c is lowered to abut against the film 61c at the area surrounding the through hole 17c to cool and set the area of the film surrounding the through hole. The cooling end face of the cooling die 56c is maintained at a low temperature by circulating water 57c through the cooling die. Thereafter negative pressure from an external vacuum source (not shown) is applied through a pipe 39c in the shaping die set 31c to the cavity 34c in the cavity forming die member 33c whereby the plastic film 61c stretches and expands to closely contact the inner surfaces of the bottom and side wall of the paper container by virtue of the permeability of the bottom and side wall of the container 10c and adheres to the inner surface of the container by the temperature maintained in the film.

However, the portion 69c of the plastic film 61 facing the window forming through hole 17 of the preformed paper container 10c is preveted from further stretching and accordingly, decreasing in thickness after the plastic has reached to a desired thickness because the film portion 69c has been cooled by the cooling die 56c and maintained at a low temperature and the plastic portion 69c maintains the thickness obtained at the time when the cooling die 56c abutted against the film portion and adheres to the portion of the container side wall surrounding the through hole 17c to thereby form the peeping window.

The double-walled paper container produced in the manner mentioned just above has the side wall 12c provided with the peeping window 17 and since the container is a double-walled paper container 20c provided a peeping window and having one piece of transparent plastic film applied to the inner surface thereof, the container can be easily produced. And since a substantial portion of the plastic film is smaller in thickness as compared with the peeping window portion, the container has the advantages that a relatively small amount of plastic material is required, that the container has a water-resistance property and that the container can be produced at less expense requiring a small number of manual operations.

As mentioned just above, according to the present invention, it is contemplated that the plastic film 61c is positioned on the top of the shaping die set across the mouth of the preformed container 10c, the film is heated to a desired temperature, the assist plug 53c is lowered in two discrete stages to stretch and expand into the container and as the film is stretched and expanded, when the film portion 69c corresponding to the peeping window 17c has reached a desired thickness, the cooling die 56c abuts against the film portion to cool and set the film portion. However, the configuration of the lower end face of the assist plug 53c, the descending timing of the assist plug, the configuration of the cooling face of the cooling die 56c and the abutting timing of the cooling die end face against the film can be selectively varied depending upon the size and tapered configuration of the preformed cup-shaped container 10c and the position and size of the peeping window as desired and necessary.

In any of the embodiments described hereinabove, the container is a double-walled construction comprising the preformed paper container having the side wall and bottom and the thin synthetic resin container having the side wall and bottom similar in shape to and smaller in size than the corresponding components of the paper container. The double-walled construction has in combination the advantageous perfect water-tight property inherent in the synthetic resin container and the less expensive and rigid properties inherent in the paper container. However, the rigidity of the container is required to maintain the shape of the container when gripped and thus, only the side wall is required to be rigid sufficient to bear the container gripping force and the bottom is not required to have high rigidity.

Thus, it is also one object of the present invention is to provide a double-walled paper container lined with a seamless continuous and water-tight piece of synthetic resin which can be produced at relatively less expense, which can eliminate any paper layer on the bottom where sufficient rigidity is not required while retaining a required shape holding strength against gripping force and the method for producing the paper container.

Figure 19:
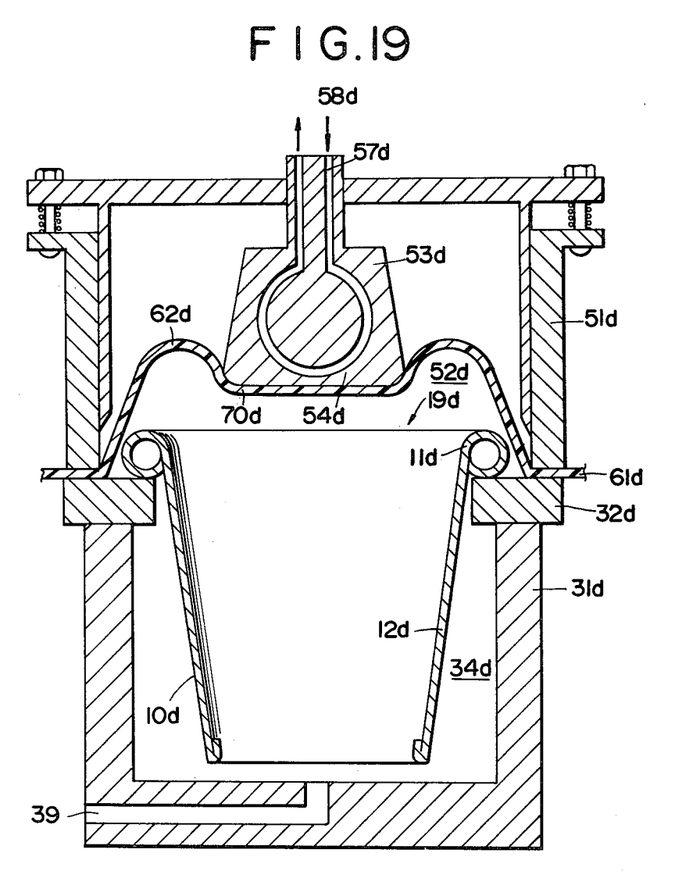
FIGS. 19 and 20 are fragmentary sectional views of another type of shaping die set for producing a double-walled container having the bottom which is formed of plastic only.
Figure 20:
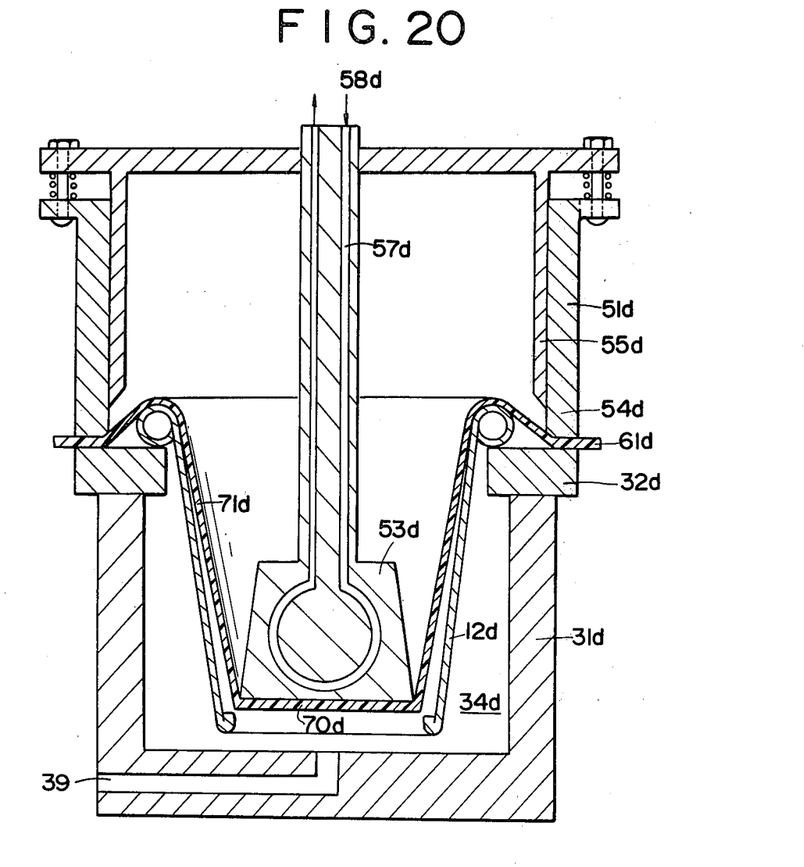

The embodiment of the present invention as shown in FIG. 19 and FIG. 20 is directed to a so-called "no-bottom container" comprising only the mouth upper peripheral rimm 11d and side wall 12d with the bottom eliminated therefrom. In the production of the no-bottom container a paper container having only the side wall 12d provided with the curled mouth upper peripheral rim 11d at the upper end thereof is preformed, the preformed paper container 10d is placed in the cavity 34d in the shaping die set 31d, a piece of synthetic resin fils 61d is positioned on the frame member 32d of the die set across the mouth upper peripheral rim 11d of the container, the upper frame 51d is lowered towards the die set 31d to pinch the film between the lower end of the upper frame 51d and the top of the frame member 32d of the die set 31d.

Thereafter, the assist plug 53d having the flat surface portion portion 54d maintained at a low temperature with the water 58d circulating the water conduit 57d is lowered into the cavity in the upper frame 51d to abut against the film 61d, hot air is pumped from an external source (not shown) throught the exhaust conduit 39d formed in the die set 31d to stretch the film 61d by reference numeral 62 and the assist plug 53d is lowered into the cavity in the side wall 12d to a predetermined position whereupon the portion of the film where the flat surface portion 54d of the assist plug 53d contacts is cooled and depressed down without stretching and maintaining its thickness obtained at the time of contact by the assist plug 53d to form the relatively thick bottom 70d for the complete paper container. On the other hand, the remaining portion of the film 61d where the flat surface portion 54d of the assist plug 53d did not contact is stretched downwardly as the assist plug 53d descends to form the thin resin side wall 71d (see FIG. 20). Thereafter, negative pressure is applied from an external vacuum source (not shown) through the exhaust conduit 39d formed in the die set 31d to the cavity 34d in the shaping die 31d and at the same time, more or less positive pressure is applied against the external surface of the assist plug 53d within the cavity 52d in the upper frame 51d to thereby produce differential pressure on the upper and lower surfaces of the film 61d so as to draw the resin container side wall 71d against the inner surface of the paper container side wall 12d to cause the side wall to firmly adhere to the resin container side wall. In such case, if a heat seal agent has been previously applied to the inner surface of the paper container side wall 12d, a more positive joint is established between the resin container side wall 71d and paper container side wall 12d.

The container 20d produced in the manner mentioned hereinabove comprises the inner resin container including the relatively thin resin side wall 71d and relatively thick resin bottom 70d and the outer paper container including the paper side wall 12d disposed outside of the corresponding side wall 71d and integrally secured to the latter. Thus the amount of synthetic resin employed is a relatively small amount and the container can be produced at less expense. Although the resin container side wall 71d has a thin thickness, since the side wall is integrally joined to the outer paper container side wall 12d, the resin container side wall has a sufficient shape holding ability and is free of deformation when gripped.

And according to the present invention, after the synthetic resin container bottom 70d has been formed by the assist plug 53d having the cooled lower flat portion 54d negative pressure is lied from the external vacuum source through the exhaust conduit 39d to the cavity 34d in the shaping die set 31d and at the same time, hot air under pressure is applied to the external surface of the assist plug 53d to firmly contact the thin synthetic resin to the paper container mouth upper peripheral rim and side wall 12d, the upper frame 51d is then lowered in two discrete stages to shear excessive film off the film 61d by the cutting edge 55d on the upper frame 51d, the upper frame 51d is raised and the cavity in the sha ping die set supplied with air under pressure through the exhaust conduit 39d to remove the complete double-walled container from the die set.

While preferable embodiments of the invention have been shown and described in detail, it will be understood that the same are for illustration purpose only and not to be taken as a definition of the invention, reference being had for this purpose to the appended claims.

What is claimed is:

1. A method for producing a double-walled paper container having a peeping window in the side wall comprising the steps of placing a paper container having a peeping window forming through hole in a side wall thereof in a shaping die set, positioning a piece of synthetic resin film or sheet on the top of said shaping die set in tension across the mouth of said paper container, stretching said film or sheet into the cavity in said paper container by means of an assist plug, cooling said film or sheet in the area to be aligned with said peeping window forming through hole, and applying negative pressure to the cavity in said die set to further stretch the portion of said film or sheet except for the portion to be aligned with said window forming through hole so as to apply the film or sheet portion to the inner surface of said paper container with said cooled and unstretched film or sheet portion being aligned with said peeping window through hole.

2. A method for producing a paper container lined with plastic sheet comprising the steps of: placing a side wall portion constituting a portion of said paper container into a shaping die set cavity of a vacuum draw shapable apparatus so as to protrude an upper portion of the side wall portion beyond an upper surface of the die; positioning a sheet of the plastic material on the top of said side wall portion; securing the sheet against movement at the outer peripheral portion of the upper portion of said side wall in predetermined spaced relation; heating the plastic sheet; engaging the central portion of the plastic sheet by a plunger; stretching said heated sheet partially into the side wall portion using the plunger; applying negative pressure to said die set cavity so as to direct said drawn plastic sheet to said side wall portion and to form a bottom portion of said lined paper container; and severing the plastic sheet between the plastic sheet portion secured against movement and the plastic sheet portion engaging a top portion of said side wall portion at a location remote from said side wall portion, said side wall portion having a peeping window and that portion of the plastic sheet aligned with the peeping window being cooled and unstretched by the plunger when the heated plastic sheet is partially stretched into the side wall portion.

* * * * *